Patented Dec. 19, 1922.

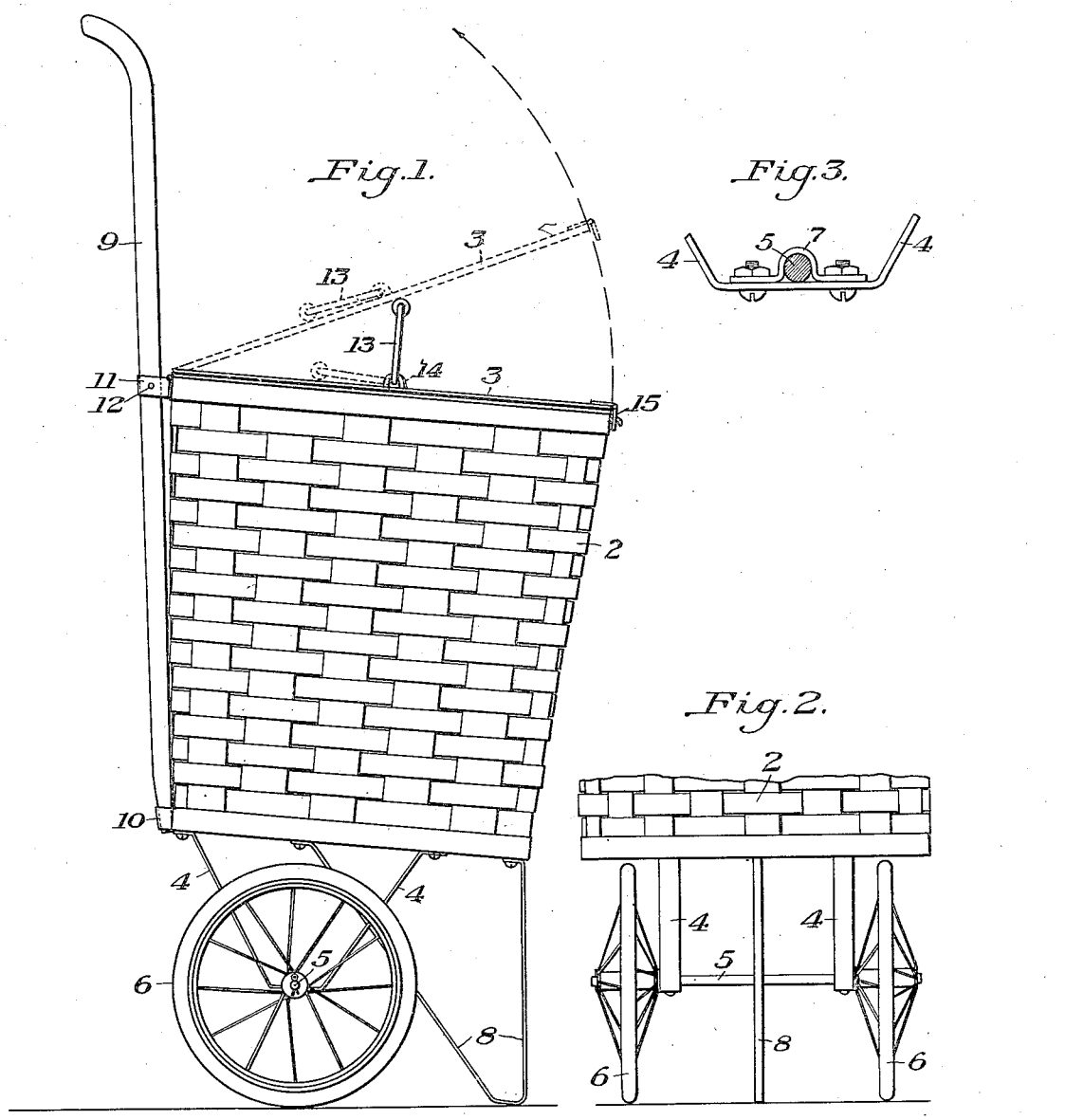

1,439,392

UNITED STATES PATENT OFFICE.

GLENN R. AMON, OF HELENA, OHIO.

MARKET BASKET.

Application filed April 10, 1920. Serial No. 372,797.

*To all whom it may concern:*

Be it known that I, GLENN R. AMON, residing at Helena, in the county of Sandusky and State of Ohio, have invented a new and useful Improvement in Market Baskets, of which the following is a full, clear, and exact description, reference being had to the accompanying drawings, forming part of this specification, in which—

Figure 1 is a side elevation of my improved market basket;

Figure 2 is a partial front elevation; and

Figure 3 is a detail view of the preferred form of axle support.

My invention relates to market baskets, and is designed to provide a basket which may be either carried in the hand or on the arm or may be wheeled about, thus transferring the load of the basket when filled or partially filled to the ground.

In the drawings, 2 represents a large market basket which may be of any desired type, and preferably has a lid 3. To the bottom of this basket are fastened brackets 4, 4, forming axle supports for a shaft 5, having supporting wheels 6. The brackets may be provided with removable loops 7, as shown in Figure 3, to secure the shaft in place, the wheels rotating on the axle. 8 is a rest to support the basket when standing still. The basket is so arranged that the weight will rest on this loop. 9 is a handle of any desired type, which is shown as having its lower end engaging the loop 10, and its intermediate portion passing through a loop 11, secured to the side of the basket. The handle may be secured in one or both of these loops by removable pin or pins 12.

The numeral 13 designates a swinging handle extending over the top of the cover 3 and having its ends loosely secured in eyes 14, fastened to the sides of the cover. This handle will drop down into the dotted line position when the basket is being pushed along on its wheels. 15 is a hasp for securing the cover or lid, particularly when carried by the handle 13.

The advantages of my invention result from the provision of a market basket with wheels so that it may be wheeled about, thus enabling the owner to use a large basket while avoiding carrying the weight of it, except when getting on street cars, etc.

Many changes may be made in the form of the basket, the supporting wheels, handle, etc., without departing from my invention.

I claim:

A market basket having wheels directly secured to the bottom thereof, a cover having a carrying handle and a second handle detachably secured to said basket and constituting, when in operative position, a support for said cover when in open position, substantially as described.

In testimony whereof, I have hereunto set my hand.

GLENN R. AMON.